United States Patent [19]

Decoene

[11] 4,422,462
[45] Dec. 27, 1983

[54] DRIVE MECHANISM FOR ROTARY CLEANING DEVICE

[75] Inventor: Frans J. G. C. Decoene, Zedelgem, Belgium

[73] Assignee: Sperry Corporation, New Holland, Pa.

[21] Appl. No.: 408,981

[22] Filed: Aug. 17, 1982

[51] Int. Cl.³ .............................................. A01F 12/00
[52] U.S. Cl. ........................... 130/27 AA; 130/27 T; 130/22 A; 130/27 M
[58] Field of Search ...................... 56/13.3, 14.6, 16.5, 56/DIG. 2, DIG. 5; 130/DIG. 5, 22 A, 24, 27 R, 27 AD, 27 AC, 27 AA, 27 Z, 27 Y, 27 Q, 27 M, 27 HF; 209/26, 27, 287

[56] References Cited

U.S. PATENT DOCUMENTS

| 1,306,239 | 6/1919 | White | 130/27 Q |
|---|---|---|---|
| 3,534,742 | 10/1970 | Knapp | 56/14.6 |
| 3,756,406 | 9/1973 | Khan | 209/291 |
| 3,771,298 | 11/1973 | Schmitt | 56/14.6 |
| 3,808,780 | 5/1974 | Wood | 56/14.6 |
| 4,198,802 | 3/1980 | Hengar et al. | 130/27 T |
| 4,259,829 | 4/1981 | Strubbler | 130/27 R |
| 4,284,086 | 8/1981 | Williams | 130/27 M |

FOREIGN PATENT DOCUMENTS

| 964150 | 3/1975 | Canada | 130/27 R |
|---|---|---|---|
| 3016180 | 10/1981 | Fed. Rep. of Germany . | |
| 445479 | 2/1973 | U.S.S.R. | 209/287 |
| 1181282 | 2/1970 | United Kingdom . | |

OTHER PUBLICATIONS

Park & Harmond, "Vertical Rotating Screen Separator," 1966.

Primary Examiner—Robert P. Swiatek
Assistant Examiner—John Weiss
Attorney, Agent, or Firm—Larry W. Miller; Frank A. Seemar; Darrell F. Marquette

[57] ABSTRACT

A drive mechanism for rotatably powering a rotary cleaning device for cleaning threshed grain in a combine harvester is disclosed wherein a cleaning cylinder, an infeed mechanism, a fan, and an impeller are rotatable about a common axis of rotation defined by a composite drive shaft that includes a first shaft member having a tubular portion and a second shaft member rotatably received within the tubular portion for rotation independently of the first shaft member. Pulleys keyed to the first and second shaft members rotatably drive the infeed mechanism and the impeller. The fan and the cleaning cylinder are driven by pulleys rotatably mounted on the composite shaft for rotation independently thereof, thereby permitting each component to be driven at different rotational speeds. A mechanism for reciprocatably moving the cleaning shoes during rotation of the cleaning cylinder is also operatively powered by the rotation of the composite drive shaft.

20 Claims, 8 Drawing Figures

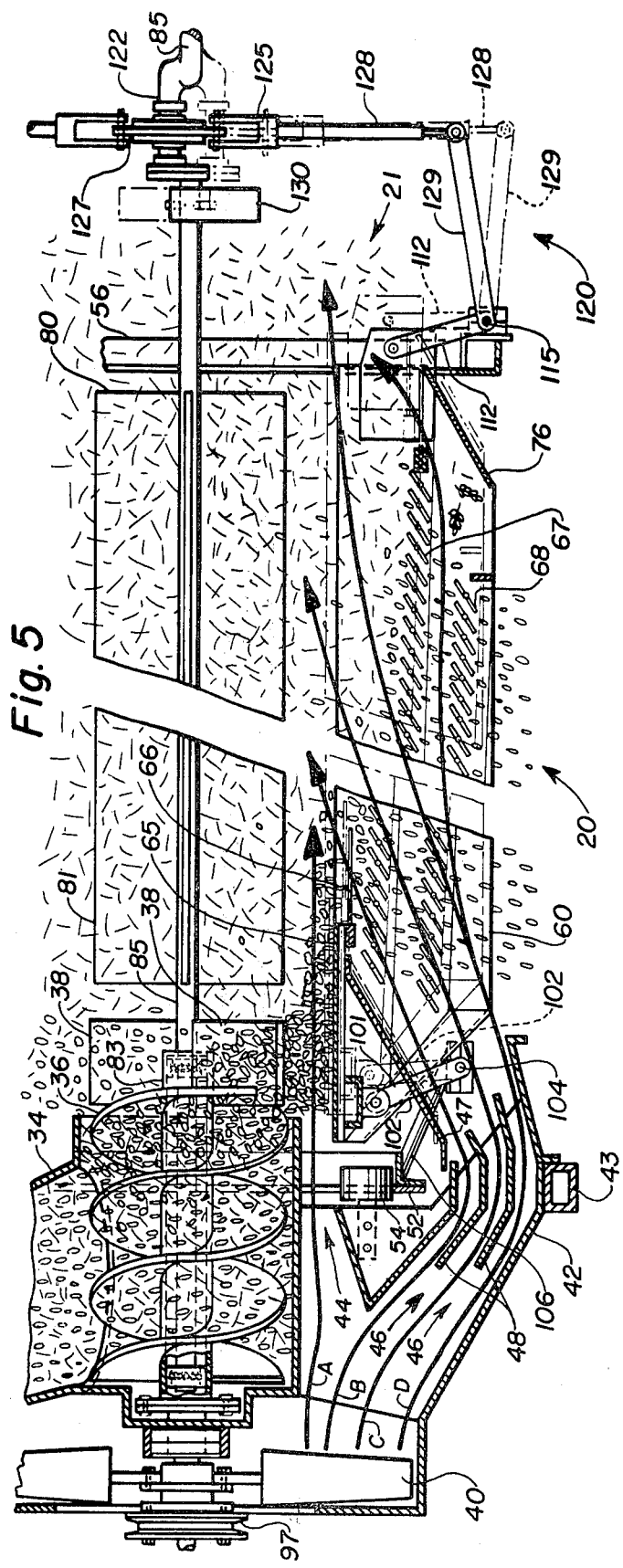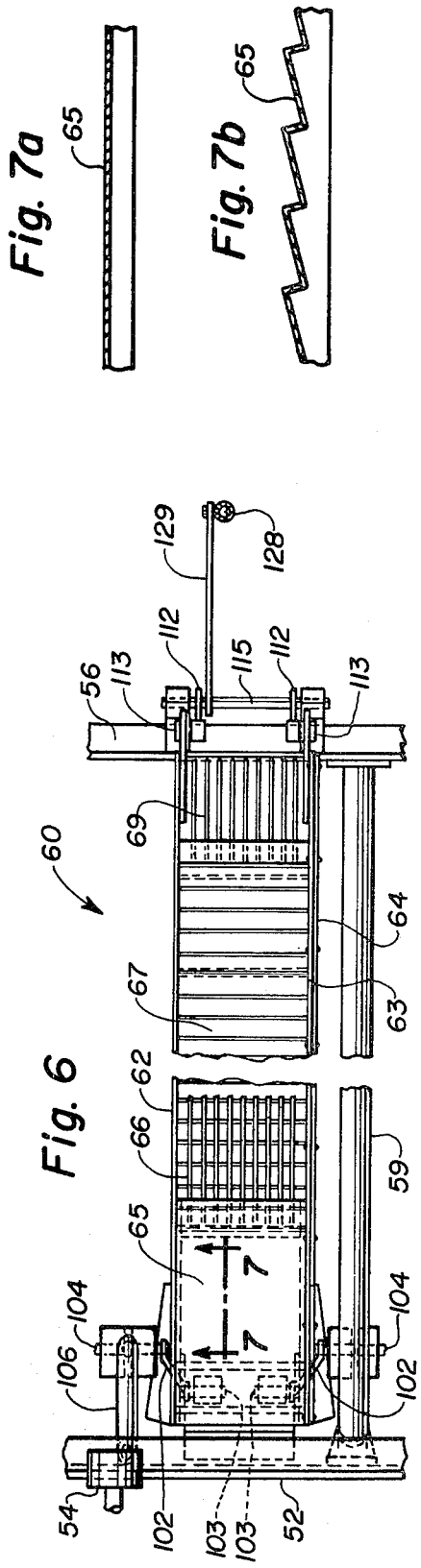

DRIVE MECHANISM FOR ROTARY CLEANING DEVICE

BACKGROUND OF THE INVENTION

The present invention relates generally to combine harvesters and, more particularly, to a rotary cleaning mechanism in combines for cleaning unwanted residue, such as chaff, straw, etc., from threshed grain.

Conventional cleaning systems clean threshed grain by blowing air through a set of planar sieves utilizing gravitational forces to urge cleaned grain through the sieve openings. With the advent of higher capacity threshing and separating mechanisms, such as rotary axial flow combines, the capacity for threshing grain has increased beyond the capacity of conventional cleaning systems to clean the grain. Accordingly, it is desirable to increase both the capacity and the efficiency of cleaning systems in combine harvesters so as not to limit the throughput capability of the combine.

The mounting of a rotary cleaning mechanism within the comfines of a combine base unit requires that the drive mechanism for the individually rotatable components of the cleaning mechanism be compactly situated. Further complicating the drive arrangement is a requirement that each of the individually driven components; namely, the fan, infeed auger, impeller and cleaning cylinder, be driven at different rotational speeds for optimal cleaning results. Also, a mechanism for reciprocating the cleaning shoes during rotation of the cleaning cylinder needs to be operatively powered by the drive mechanism.

SUMMARY OF THE INVENTION

It is an object of this invention to overcome the aforementioned disadvantages of the prior art by providing a drive mechanism for rotary cleaning device that permits four rotatable components of the cleaning device to be rotated independently of each other at different rotational speeds along a common axis of rotation.

It is a feature of this invention that the drive mechanism can be compactly situated in a combine base unit for driving a rotary cleaning device.

It is another feature of this invention that each of the individually driven components of the rotary cleaning device are rotatable about a common axis of rotation.

It is another object of this invention to define the axis of rotation of the rotary cleaning device by a single composite drive shaft.

It is an advantage of this invention that the composite drive shaft includes a first shaft member rotatably receiving a second shaft member therewithin so that the two shaft members can be driven at different rotational speeds.

It is another advantage of this invention that the mechanism for reciprocating cleaning shoes mounted on the rotatable cleaning cylinder can be operatively powered by the composite drive shaft.

It is still another feature of this invention that the tubular portion of the first shaft member rotatably receiving the second shaft member can have helical flighting attached thereto to form the infeed auger.

It is still another advantage of this invention that each individually drivable component of a rotary cleaning device can be rotatably driven at different rotational speeds.

It is still another object of this invention to provide a drive mechanism for a rotary cleaning device in a combine harvester which is durable of construction, inexpensive of manufacture, carefree of maintenance, facile is assemblage and simple and effective in use.

These and other objects, features and advantages are accomplished according to the instant invention by providing a drive mechanism for a rotary cleaning device in a combine harvester wherein a cleaning cylinder, an infeed mechanism, a fan and an impeller are rotatable about a common axis of rotation defined by a composite drive shaft that includes a first shaft member having a tubular portion and a second shaft member rotatably received within the tubular portion for rotation independently of the first shaft member. Pulleys keyed to the first and second shaft members rotatably drive the infeed mechanism and the impeller. The fan and the cleaning cylinder are driven by pulleys rotatably mounted on the composite shaft for rotation independently thereof, thereby permitting each component to be driven at different rotational speeds. A mechanism for reciprocatably moving the cleaning shoes during rotation of the cleaning cylinder is also operatively powered by the rotation of the composite drive shaft.

BRIEF DESCRIPTION OF THE DRAWINGS

The advantages of this invention will become apparent upon consideration of the following detailed disclosure of the invention, especially when taken in conjunction with the accompanying drawings wherein:

FIG. 5 is a diagrammatic view of a portion of the rotary cleaning mechanism to show the operation thereof relative to one of the individual cleaning shoes, as well as the flow of air through the fan housing to clean the grain, the oscillatory movement of the cleaning shoe being shown in phantom;

FIG. 6 is a partial cross-sectional view showing one of the individual cleaning shoes and associated connecting linkages, taken along lines 6—6 of FIG. 3;

FIG. 7a is a partial cross-sectional view of the grain pan forming a part of each individual cleaning shoe, taken along lines 7—7 of FIG. 6; and FIG. 7b is a partial cross-sectional view corresponding to FIG. 7a but showing an alternative embodiment of the grain pan configuration.

DETAILED DESCRIPTION OF THE PREFERRED EMBODIMENT

Figure 1:
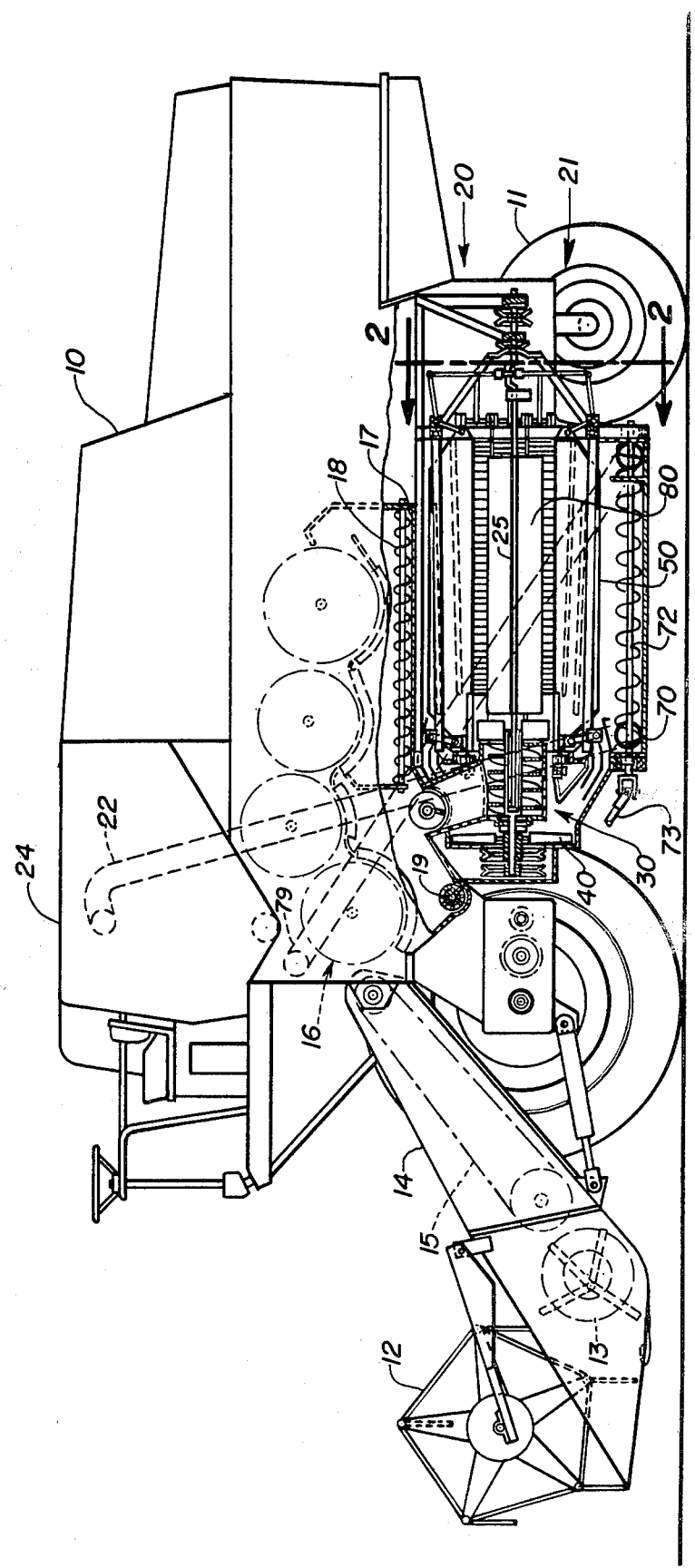
FIG. 1 is a side elevational view of a crop harvesting machine, commonly referred to as a combine, incorporating the principles of the instant invention, a portion of the combine being broken away to highlight the rotary cleaning mechanism housed therein.

Referring now to the drawings, and particularly to FIG. 1, a side elevational view of a crop harvesting machine, commonly referred to as a combine, can be seen. The combine base unit 10 is mounted on a wheeled frame 11 and operatively powered by an engine (not shown) suitably housed within the base unit 10 to provide driving power for the mobile base unit 10 and the harvesting apparatus mounted thereon and described below. The transfer of rotational power from the engine to the various driven components is of a conventional nature and could include fixed or variable belt or chain drives and have not been shown in the drawings for purposes of clarity.

A forwardly mounted crop harvesting header 12 is conventional in the art and is operable to sever the standing crop, consolidate it and feed it rearwardly by means such as the auger 13 to the feeder housing 14, interconnecting the base unit 10 and the header 12. The feeder housing 14 is generally a hollow conduit for housing a crop conveyor 15 operable to convey the consolidated crop material to the base unit 10. Threshing and separating apparatus 16 is suitably housed within the base unit 10 to receive crop material being fed rearwardly by the feeder house conveyor 15 and thresh the crop material to separate the edible grain crop from the waste material, such as stalks, straw and other residue. The threshing and separating means 16 seen in FIG. 1 is of the type described in detail in U.S. Pat. No. 3,946,746. It should be noted by one skilled in the art that the threshing and separating means 16 could also be of other designs, such as a conventional threshing cylinder and concave or a rotary axial flow.

As can be seen in FIG. 1, the uncleaned threshed grain is collected on a floor 17 and conveyed to a central collection point by at least one auger 18 and/or a throwing mechanism 19 for delivery to a cleaning mechanism 20 to clean the edible grain from remaining residue such as chaff and short pieces of straw. After being cleaned, the grain is transported by an elevating mechanism 22 to a grain tank 24 supported by the frame 11 in the base unit 10 for temporary storage during the harvesting operation, while the unwanted residue is discharged from the discharge end 21 of the cleaning mechanism 20.

Figure 3:
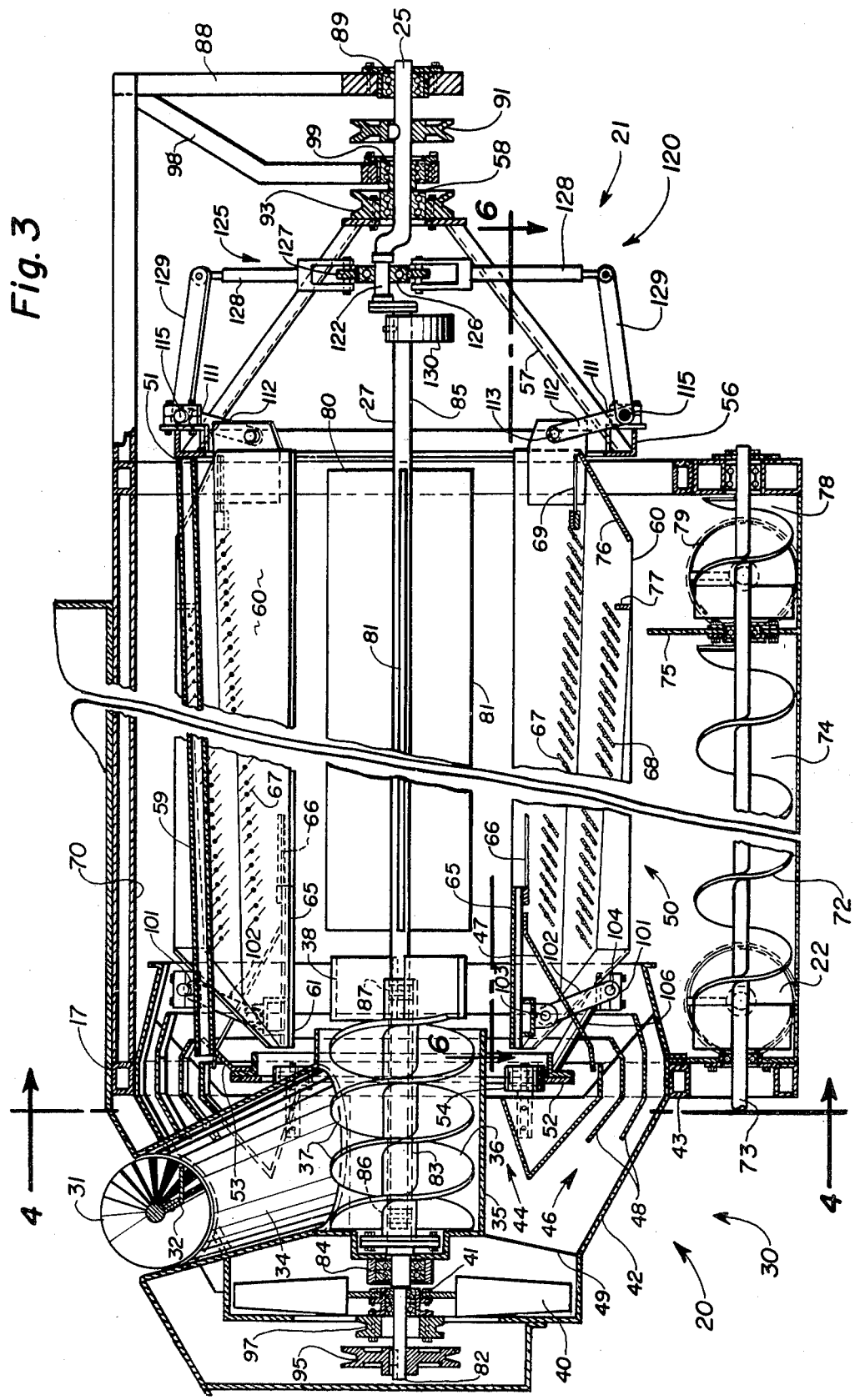
FIG. 3 is a partial cross-sectional view of the rotary cleaning mechanism taken along lines 3—3 of FIG. 2, lines 3—3 being taken between individual cleaning shoes at the top of the drawing and cross-sectionally through a cleaning shoe at the bottom of the drawing, other cleaning shoes and associated connecting mechanisms being removed for purposes of clarity.

Referring to FIGS. 1 and 3, it can be seen that the cleaning mechanism 20 is rotatably supported within the base unit 10 for rotation about an axis of rotation 25 defined by a composite shaft 27. The cleaning mechanism 20 includes an infeed mechanism 30, a blower fan 40, a rotatable cleaning cylinder 50, including individually oscillating cleaning shoes 60, an impeller 80, a housing 70 for collecting the cleaned grain, a conveying auger 72 for transporting collected cleaned grain to the elevator 22 for transfer to the grain tank 24, and a drive mechanism for rotatably powering the rotary cleaning mechanism 20 and oscillating the individual cleaning shoes 60.

INFEED MECHANISM

Figure 4:
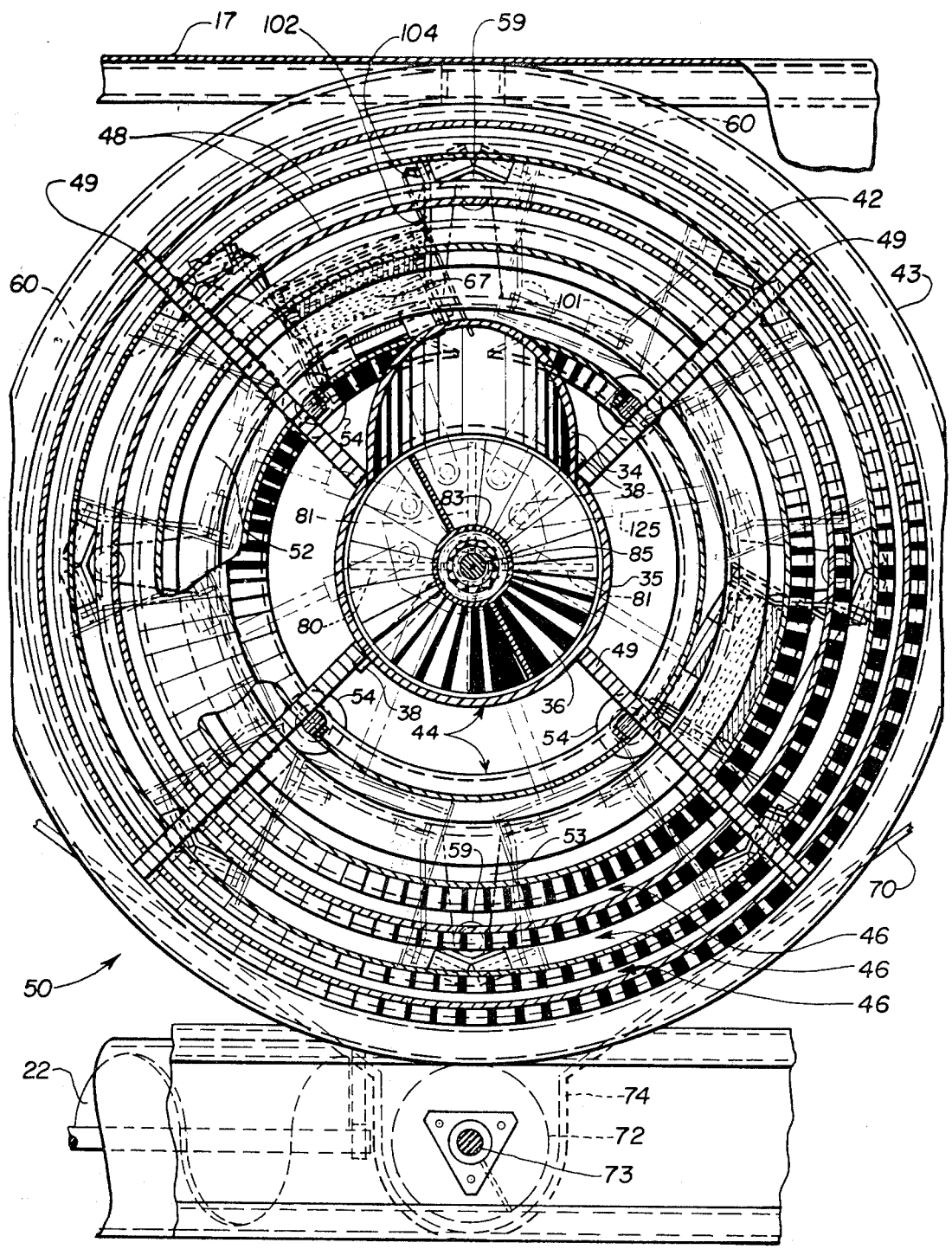
FIG. 4 is a cross-sectional view of the rotary cleaning mechanism taken along lines 4—4 of FIG. 3 to show the infeed area and fan housing, portions being broken away for clarity.

The infeed mechanism 30 is generally seen in FIG. 1, but best seen in detail in FIGS. 3 and 4. Uncleaned grain conveyed by a series of augers 18 over the floor 17 and by the thrower mechanism 19 is collected by a transversely disposed collecting auger 31 (also seen in phantom in FIG. 2) and consolidated toward a centrally disposed infeed chute 34. The uncleaned grain is directed down an infeed chute 34 by gravity and by at least one paddle 32 forming a part of the transverse collecting auger 31 above the infeed chute 34. The infeed chute 34 forms part of the infeed housing 35 within which is mounted an infeed auger 36 rotatable about, the axis of rotation 25.

The infeed auger 36 is shown as having double helical flights 37 terminating in a pair of distributing paddles 38 for discharging uncleaned grain radially outwardly from the infeed auger 36 onto the cleaning cylinder 50. One skilled in the art will readily realize that the paddles 38 may be disposed at an angle to a line extending radially outwardly from the auger shaft 83. As is best seen in FIG. 3, the infeed chute 34 flares out from top to bottom such that the portion of the chute 34 adjacent the transverse auger 31 is smaller than the portion of the chute 34 adjacent the infeed auger 36. This particular infeed chute configuration will help prevent clogging problems in the transfer of uncleaned grain from the auger 31 to the infeed auger 36.

BLOWER HOUSING

To provide a flow of air to clean unwanted chaff, short straw, etc. from the grain within the cleaning cylinder 50, a blowing fan 40, best seen in FIGS. 1 and 3, is rotatably mounted on the composite shaft 27 by bearing 41 within housing 42 to blow air toward the cleaning cylinder 50. The fan housing 42 surrounds the infeed housing 35 and is stationarily mounted on the sub-frame 43 to direct air blown by the fan 40 toward the cleaning cylinder 50 around the infeed housing 35. The infeed chute 34 is somewhat eliptical in cross-sectional configuration to enable air to flow therearound and reach the cleaning cylinder 50 immediately adjacent thereto. It should be noted that the infeed housing 35 and infeed chute 34 are also stationarily mounted on the sub-frame 43, while the cleaning cylinder 50 is rotatable relative thereto about the axis of rotation 25.

The fan housing 42 is generally circular and includes a first annular passageway 44 adjacent the infeed housing 35 to direct air toward the grain being discharged from the distributing paddles 38 before contacting the cleaning cylinder 50. The fan housing 42 also defines a second annular passageway 46 for directing air rearwardly along the cleaning cylinder 50 in a direction generally radially inwardly toward the centrally disposed axis of rotation 25. As can be seen in FIGS. 1, 3, 4 and 5, a series of generally concentric deflector vanes 48 are disposed within the second passageway 46 and structurally supported by struts 49 extending radially outwardly from the infeed housing 35 to distribute the air blowing through the second passageway 46 along the length of the entire cleaning cylinder 50 to clean the residue from the grain and discharge it out of the discharge end 21.

A deflector plate 47 is affixed to the cleaning cylinder 50 and extends forwardly therefrom to a position adjacent the fan housing 42 to assist in directing the flow of air from the fan 40. Although not shown in the drawings, it is well known that additional deflector plates could be provided on the cleaning cylinder 50 to further direct the flow of air 40. The arrows A, B, C and D in FIG. 5, diagrammatically indicate the flow of air through the fan housing 42 to the cleaning cylinder 50 for cleaning the chaff and other residue from the uncleaned grain. It should be realized by one skilled in the art that this air flow pattern extends 360° around the infeed housing 35, except as is necessary to bypass the infeed chut 34, and is provided by a fan 40 having a relatively small diameter compared to the overall dimensions of the cleaning cylinder 50.

CLEANING CYLINDER

The cleaning cylinder 50 is generally comprised of a plurality of elongated, axially extending cleaning shoes 60 rotatably supported on the composite shaft 27 by a frame 51. The frame 51 includes a forward support ring 52 rotatably supported on rollers 54 carried by the struts 49 and a rearward support ring 56 rotatably supported through frame members 57 by the bearing 58 on the composite shaft 27. A plurality of fore-and-aft extending frame members 59 extend between the forward support ring 52 and the rearward support ring 56 to provide the required rigidity and support for the cleaning cylinder 50. As is best seen in FIG. 3, the rearward support ring 56 is of a larger diameter than the forward support ring 52. The fore-and-aft frame members 59 are connected to the forward support ring 52 via a flange 53 and connect directly to the rearward support ring 56.

Figure 2:
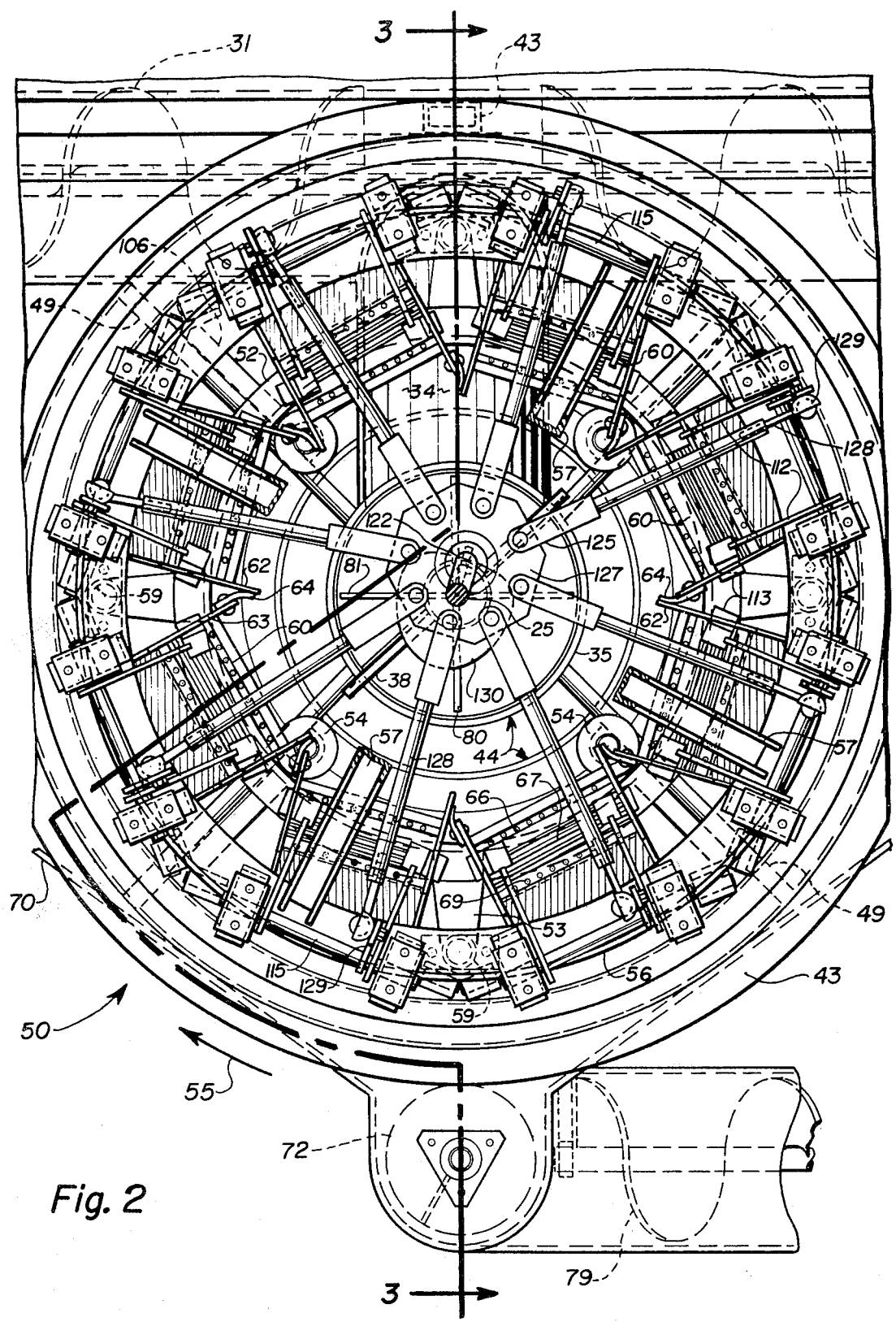
FIG. 2 is an enlarged cross-sectional view of the rotary cleaning mechanis taken along lines 2—2 of FIG. 1, extraneous portions of the combine being broken away for clarity.

A plurality of cleaning shoes 60 are equidistantly spaced around the circumference of the cleaning cylinder 50 and supported by the frame 51. As is seen in FIGS. 2 and 4, the preferred embodiment incorporates eight individual elongated cleaning shoes 60 extending generally between the forward support ring 52 and the rearward support ring 56. Each cleaning shoe 60 is supported from the frame 51 by linkages 101,111, described in further detail below, to permit an oscillating, generally fore-and-aft motion thereof relative to the frame 51. Each shoe 60 includes first and second spaced-apart generally parallel sidewalls 62,63 that are disposed generally radially to the composite drive shaft 27. Adjacent cleaning shoes 60 are positioned such that the first sidewall 62 of one shoe 60 is adjacent the second sidewall 63 of the adjacent shoe 60. A flexible seal 64 is connected to each second sidewall 63 to contact the adjacent first sidewall 62 and form a seal therebetween and direct crop into one or the other of the adjacent shoes 60.

The construction of each individual cleaning shoe 60 is best seen in FIGS. 3 and 6. The forward end 61 of each cleaning shoe 60 includes a grain pan 65 disposed radially outwardly from the distributing paddles 38 to receive grain discharged therefrom and convey the grain rearwardly onto the inner sieve 67. It is not desirable to discharge grain from the paddles 38 directly onto the inner sieve 67 as plugging could occur. As is seen in FIGS. 7a and 7b, the grain pan 65 can have either a smooth or a saw tooth cross-sectional configuration. Because of the combined oscillatory and rotary movements of the cleaning shoes 60, as will be described in further detail below, it has been found that a smooth grain pan 65, as seen in FIG. 7a, will sufficiently convey grain rearwardly toward the discharge end 21 of the cleaning cylinder 50. As seen in FIG. 3, the grain pan 65 is spaced radially outwardly from the distributing paddles 38 so that air flowing through the first passageway 44 can partially clean the grain before contacting the grain pan 65.

The spaced-apart sidewalls 62,63 of each cleaning shoe adjustably support an inner sieve 67 and an outer sieve 68 spaced radially outwardly relative to the composite shaft 27 from the inner sieve 67. The sieves 67,68 are generally of conventional construction, having an adjustable setting to correspond to different crops and crop conditions. The sieves 67,68 are operable to permit the passage of clean grain therethrough while the unwanted residue is blown rearwardly from the cleaning cylinder 50 by the flow of air generated by the fan 40. Further detail of the construction and operation of the sieves can be found in U.S. Pat. No. 4,259,829.

As shown in FIGS. 3 and 5, the preferred embodiment incorporates cleaning sieves 67,68 extending at a slight angle to the axis of rotation 25 and diverging from the axis of rotation 25 as they extend rearwardly away from the infeed mechanism 30. The sieves 67,68 could be disposed generally parallel to the axis of rotation 25. As is best seen in FIG. 2, the cleaning sieves 67,68 are disposed in a generally tangential direction to the radius of the cleaning cylinder 50 but at a slight angle inclined in the direction of rotation of said cleaning cylinder 50. This slight angle of inclination is preferably in the range of 3° to 10° and is intended to avoid threshed grain accumulating on the sieves 67,68 at the side edges thereof opposite to the direction of rotation of the cleaning cylinder 50 and against the cleaning shoes sidewalls 62.

As can be seen in FIG. 3, the inner sieve 67 is spaced generally radially outwardly from the grain pan 65. Grain being moved rearwardly on the grain pan 65 by the oscillatory movement of the cleaning shoes 60 will fall radially outwardly, due to centrifugal forces generated by the rotation of the cleaning cylinder 50, from the grain pan 65 onto the inner sieve 67. A series of raking tines 66 are attached to the rearward end of the grain pan 65 to comb through the grain passing from the grain pan onto the inner sieves 67. The combing action of the raking times 66 allows smaller material, such as the grain, to drop first onto the sieve 67 while the longer straw residue is normally held up, preferably falling on top of the mat of grain settling onto the inner sieves 67. Accordingly, the raking tines 66 will be operable to somewhat grade the grain to be cleaned, thereby helping the cleaning process and permit the mat of grain crop placed onto the inner sieves 67 to be less dense.

A second set of raking tines 69 is positioned at the end of the inner sieve 67 to permit any unthreshed heads of grain crop to pass therethrough and drop to a tailings auger, as will be described in further detail below, while any remaining residue having sufficient weight to prevent it from becoming airborne, such as longer pieces of straw, can pass rearwardly from the cleaning cylinder 50 beyond the rearward support ring 56 for discharge from the cleaning mechanism 20.

A generally cylindrical stationary housing 70 forms a shell surrounding the rotating cleaning cylinder 50. Because of the rotational movement of the cleaning cylinder 50, centrifugal forces are generated to urge cleaned grain to pass radially outwardly through the sieves 67,68 and exit from the cleaning shoes 60 in a radially outward direction. Accordingly, clean grain can pass from the cleaning cylinder 50 upwardly and outwardly as well as downwardly. The stationary housing 70 prevents clean grain from being lost from the combine 10 and directs it downwardly by gravity to a conveying auger 72 rotatably driven on shaft 73.

Clean grain emerging from the outer sieves 68 of the cleaning shoes 60 will ultimately fall into the clean grain section 74 at the bottom of the housing 70 and be conveyed by the grain elevator 22 to the grain tank 24 for temporary storage. Unthreshed heads passing through the second set of raking tines 69 are directed by the ramp 76 and the baffle 77 into the tailings section 78 formed at the bottom of the stationary housing 70. The unthreshed heads are consolidated by the auger 72 and fed into the tailings auger 79 to be conveyed back to the threshing and separating means 16. A stationary baffle 75 separates the clean grain section 74 from the tailings section 78.

For centrifugal force to be effective to move the grain through the sieves 67,68, the grain must be in contact with the sieves 67,68. To assure that grain kernels will not be suspended in mid-air within the cleaning cylinder 50 without being in contact with any of the cleaning shoes 60, an impeller 80 is provided. The impeller 80 consists of four blades 81 projecting outwardly from the shaft 27 in an equally spaced relationship. Any grain contacting the impeller 80 will be forced radially outwardly onto the inner sieve 67 of the cleaning shoes 60.

It should be noted that it is desirable to have the chaff and other residue blown outwardly and rearwardly through the cleaning cylinder 50 to be discharged therefrom. Due to the force of the air being blown by the fan 40, the weight of the airborne chaff and other residue, and the speed of rotation of the impeller 80, the impeller 80 will not give sufficient impelling action to the chaff and other residue to force it radially onto the inner sieve 67 of the cleaning shoes, thereby permitting the residue to remain airborne and exit the discharge end 21.

ROTARY DRIVE MECHANISM

Drive shaft 27 is a composite shaft including an infeed auger drive shaft 82 and an impeller drive shaft 85. Also rotatably mounted on the composite shaft 27 are drives for rotatably powering the cleaning cylinder 50 and the fan 40. The impeller drive shaft 85 terminates at a bearing 86 mounted within the tubular portion 83 of the infeed auger drive shaft 82, which, in turn, terminates at bearing 87 also rotatably supporting the shaft 85 within the tubular portion 83 of the shaft 82. It should be noted that the impeller drive shaft 85 is also supported in the frame member 88 by a bearing 89. Likewise, the infeed auger drive shaft 82 is also rotatably supported by bearing 84 mounted within the infeed housing 35.

For purposes of convenience and clarity, none of the drive transfer belts and other associated mechanism extending from the engine (not shown) to the various drives, which are conventional in the art, have been shown. Only the particular pulleys and other drive components as relate directly to the cleaning mechanism 20 will be described. As can be seen in FIG. 3, the impeller drive shaft 85 is rotatably driven by pulley 91 keyed to the shaft 85 to be rotatable therewith. The cleaning cylinder 50 is rotatably driven by the pulley 93 concentrically mounted on the impeller drive shaft 85. Bearings 58 permit the pulley 93 to be rotatable independently of the shaft 85 so that pulleys 91 and 93 can be driven at different speeds.

The infeed auger drive shaft 82 is rotatably powered by the pulley 95 keyed to the shaft 82 and rotatable therewith. The fan 40 is rotatably powered through a pulley 97 affixed thereto, the fan 40 being rotatably mounted on the drive shaft 82 by the bearings 41 for rotation independently of the shaft 82. The stationary frame member 98 also rotatably supports the impeller drive shaft 85 by bearing 99 adjacent the pulley 91 to provide support thereto. It should be noted that in the preferred embodiment, each of the pulleys 91, 93, 95 and 97 are shown to be belt-driven pulleys, all of which are to be rotated in a clockwise direction when viewed from the rear, as shown by arrow 55 in FIG. 2. One skilled in the art would readily see that other equivalent ways of rotatably powering the various components could be provided, such as with chain drives and/or reversing one or more of the directions the pulleys are driven.

It has been found that satisfactory results can be obtained when the fan 40 is rotated in the range of 1500 to 2500 revolutions per minute (RPM) with the infeed auger 36 being rotated in the range of 500 to 1000 RPM, the cleaning cylinder 50 being rotated in the range of 100 to 250 RPM and the impeller 80 driven in the range of 350 to 550 RPM. It has also been found that the impeller 80 should be rotated at a speed approximately three to five times as fast as the cleaning cylinder 50. The resultant centrifugal force should be in the order of five times the force of gravity. As one skilled in the art will readily see, the force of gravity becomes a more component of the forces exerted on the grain to urge them through the sieves 67,68.

OSCILLATORY DRIVE MECHANISM

Referring now to FIGS. 2, 3 and 6, it can be seen that each cleaning shoe 60 is movably mounted for a generally fore-and-aft reciprocating movement. The forward end 61 of each cleaning shoe 60 is pivotally connected to a linkage 101 comprising a pair of spaced-apart links 102 pivotally connected by a pivot 103 at one end thereof to the cleaning shoe 60 and by a pivot 104 at the other end thereof to the cylinder frame 51. Each pivot 103,104 is affixed to a block of resilient material, such as rubber. The pivots 104 can be mounted to the fore-and-aft frame members 59 or to a separate support member 106 extending from the forward support ring 52. As can be seen in phantom in FIG. 5, the forward end of each cleaning shoe 60 is movable in a generally fore-and-aft direction inclined radially inwardly as it moves rearwardly about the pivot 104.

The rearward end of each cleaning shoe 60 is pivotally connected to a connecting linkage 111 for movement in a generally fore-and-aft direction, as described above relative to the forward end. Each connecting linkage 111 includes a pair of spaced-apart links 112 pivotally connected at one end by pivot 113 to the respective cleaning shoe 60. The opposing end of each link 112 is affixed to a rock shaft 115 pivotally supported by the rearward support ring 56. As can be seen in phantom in FIG. 5, each cleaning shoe 60 is pivotally movable in a fore-and-aft direction that is inclined radially inwardly relative to the axis of rotation 25, as it moves rearwardly.

Referring now to FIGS. 2, 3, 5 and 6, the drive mechanism 120 for oscillating each cleaning shoe 60 in the aforementioned fore-and-aft direction can be seen. The impeller drive shaft 85 is provided with an eccentric crank portion 122. A spider assembly 125 is rotatably mounted on the crank portion 122 by bearing 126 and includes a plate member 127 housing the bearing 126 and a plurality of generally radially extending push rods 128 pivotally connected to the plate member 127. A rocker arm 129 is affixed to each rock shaft 115 and extends rearwardly therefrom for pivotal connection with a corresponding push rod 128.

As can best be seen in FIGS. 2 and 3, the rotation of the impeller drive shaft 85 causes the spider assembly 125 to rotate on the crank portion 122 at a distance spaced from the axis of rotation 25. This orbiting of the plate member 127 causes each push rod 128 to move from a radially inward position to a radially outward position and back to the radially inward position with each revolution of the drive shaft 85. The transfer of the movement of each push rod 128 to the respective cleaning shoe 60 through the connecting linkage 111 effects a reciprocatory movement of the respective cleaning shoe 60 along the previously defined radially inwardly inclined direction.

As one skilled in the art will readily realize, the oscillating movement of the cleaning shoes 60 occurs because of the relative rotational movement between the crank portion 122 and the cleaning cylinder 50. If the cleaning cylinder 50 were being rotatably driven at a rotational speed equal to the impeller drive shaft 85, the cleaning shoes 60 would not be reciprocated. Accordingly, the frequency of oscillation of each cleaning shoe 60 is equal to the rotational speed of the impeller shaft pulley 91 less the rotational speed of the cleaning cylinder pulley 93. For example, if the impeller shaft 85 were rotated at a speed of 525 RPM, and the cleaning cylinder 50 were rotated at a speed of 120 RPM, each cleaning shoe 60 would receive 405 shakes per minute.

As one skilled in the art will further realize, the spider assembly 125 seen in FIG. 2 will result in each cleaning shoe 60 being reciprocated 45° out of phase relative to the adjacent cleaning shoe 60, opposing cleaning shoes 60 being reciprocating 180° out of phase. Accordingly, the external vibrations induced by the reciprocating movement of the cleaning shoes 60 will be kept to a minimum, with the mass of cleaning shoes 60 moving forwardly being equal to the mass of cleaning shoes 60 moving rearwardly at any given point in time, resulting in a counter-balancing effect.

An alternative drive mechanism could include the use of universal joints interconnecting pairs of rock shafts 115 on adjacent cleaning shoes 60, with one rocker arm 129 being affixed to one of the rock shafts 115 of each interconnected pair of shoes 60. Under such an arrangement of parts, the spider assembly 125 would have only four push rods 128 connected, respectively, to corresponding rocker arms 129. Accordingly, each interconnected pair of shoes 60 would be oscillated together, each pair of shoes 60 being 90° out of phase with the adjacent interconnected pair of shoes 60, thereby maintaining the counterbalancing effect.

The spider assembly 125 orbiting about the axis of rotation 25 with an unsymmetrical distribution of mass relative thereto, causes a certain unbalance and would result in excessive vibrations. To keep these vibrations to a minimum, a counterweight 130 is attached to the impeller drive shaft 85 at a position adjacent the crank portion 122. The counterweight 130 is positioned on the drive shaft 85 such that its mass counterbalances the mass of the spider assembly 125 and crank eccentric 122 offset from the axis of rotation 25 of the cleaning cylinder 50.

OPERATION

Referring now to the diagrammatic view seen in FIG. 5, the operation of the cleaning mechanism 20 with respect to one of the cleaning shoes, is representatively shown. Although only one of the cleaning shoes 60 will be operatively described, it should be clear that each cleaning shoe around the entire circumference of the cleaning cylinder 50 is simultaneously operating in the same manner, with the cleaning shoe 60 at the top of the cleaning cylinder 50 discharging cleaned grain upwardly, away from the axis of rotation 25. Uncleaned grain is fed through the infeed chute 34 into the infeed housing 35 whereupon it is engaged by the infeed auger 36 and conveyed rearwardly. The distributing paddles 38 disperse the uncleaned grain in a radially outward direction toward the grain pan 65 on the cleaning shoe 60. Although FIG. 5 depicts uncleaned grain being dispersed in a representative manner by only one of the distributing paddles 38, it should be realized by one skilled in the art that the paddles 38 would be operable to feed the grain outwardly along two paths in a 360° arc. Since the infeed auger 36 is being rotated 5 to 10 times as fast as the cleaning cylinder 50, the distributing paddles 38 distribute uncleaned grain onto each of the cleaning shoes 60.

Air being blown by the fan 40 through the first annular passageway 44 along the flow line A partially cleans the grain of chaff, short straw, etc., to make a part of this residue airborne before the grain contacts the cleaning shoe 60. The airborne residue eventually passes out the discharge end 21 of the cleaning cylinder 50. THe oscillating movement of the cleaning shoe 60, as seen in phantom in FIG. 5, in a direction non-parallel to the axis of rotation 25 of the cleaning cylinder 50 causes the grain on the cleaning shoe 60 to "walk" rearwardly, as one skilled in the art will readily realize. The grain discharged by the infeed auger 36 onto the grain pan 65 will be in the form of a thick mat. The aforementioned oscillatory movement of the cleaning shoe 60 effects a grading of the material lying on the grain pan by weight. This preclassification, before passing over the sieves, assists in the cleaning operation in that the heavier grain kernels will be at the bottom of the mat with the lighter chaff and other unwanted residue on top of the mat where it is more easily made airborne.

The grain being walked rearwardly over the grain pan 65 ultimately passes through the raking tines 66 and onto the inner sieve 67. Air being blown by the fan 40 through the second passageway 46 along the flow path B effects a second cleaning blast of air to the grain before it contacts the inner sieve 67. Any grain kernel becoming separated from the cleaning shoe 60 and falling toward the center will become engaged by the impeller 80 and directed radially outwardly back onto any of the cleaning shoes by the rotating blades 81, where centrifugal force will be operable to move the grain outwardly through the sieves 67,68.

The partially cleaned grain falling onto the inner sieve 67 from the grain pan 65 is further cleaned by air blown by the fan 40 passing through the second passageway 46 along flow paths C and D, separating the chaff and other unwanted residue from the grain and discharging it rearwardly in an airborne manner. The grain of the inner sieve 67 near the grain pan 65 will still be in somewhat of a mat of decreasing thickness as it extends rearwardly on the sieve 67. The air blown by the fan 40 continues blowing through the sieves 67,68 in a rearward direction partly because of the deflector vanes 48 and partly because of the presence of the mat of crop on the inner sieve 67. It should be noted that it is desirable to have a more concentrated blast of air at the beginning of the cleaning cylinder 50 because of the greater thickness of the grain mat on the sieves 67,68 in that area.

As is noted above, the particular design of the fan housing 42 permits the installation of a relatively small diameter fan 40 when compared with the overall dimensions of the cleaning cylinder 50, to provide a flow of cleaning air directed from outside the cleaning cylinder 50 in an inward direction through the cleaning sieves 67,68 and into the axial opening in the cleaning cylinder 50 to make unwanted residue airborne within said axial opening for discharge from the cleaning mechanism 20.

Grain passing through the inner sieve 67 in a radially outward direction under the influence of the combined actions of centrifugal forces and the oscillatory movements of the cleaning shoes lands on the outer sieve 68 through which it must similarly pass before leaving the cleaning shoe 60. The grain on the inner and outer sieves 67,68 continues to be walked rearwardly by the oscillatory motion of the cleaning shoe 60 until passing through the second sieve 68. Any grain or unthreshed heads not passing through the inner sieve 67 will finally pass through the raking tines 69 at the end of the inner sieves 67 and be returned to the threshing and separating mechanism 16 by the tailings auger 79. Chaff, straw and other unwanted residue is discharged from the end 21 of the cleaning cylinder 50 to be deposited on the ground rearwardly of the base unit 10.

The cleaning cylinder 50 is rotated so as to subject the grain on the cleaning shoes 60 to centrifugal forces in the range of five times the force of gravity. On the other hand, the fan housing 42, infeed housing 35 and infeed chute 34 are stationary structures. Air blowing around the infeed chute 34 and the annular passageways 44,46 provide for 360° cleaning action within the cleaning cylinder 50. Any irregularities in the distribution of cleaning air from the fan 40 through the cleaning cylinder 50 do not have a significant effect on the performance of the cleaning mechanism 20 because of the relatively rapid rotation of the cleaning cylinder 50. Cleaned grain exiting radially outwardly from the cleaning shoe 60 falls by gravity into the conveying auger 72 to be fed into the grain elevator 22 for transport to the grain tank 24. The use of centrifugal force to urge clean grain through the sieves 67,68, instead of gravity, as is used in conventional cleaning systems, provides for a greatly improved capacity with a shorter cleaning device that is substantially independent of hillside, lateral or fore-and-aft inclinations. Furthermore, the amount of centrifugal force to be applied to the grain is variable by controlling the speed of rotation of the cleaning cylinder 50, while gravitations forces are not.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without department from the scope of the invention. Accordingly, the following claims are intended to protect the invention broadly as well as in the specific form shown.

Having thus described the invention, what is claimed is:

1. In a rotary cleaning mechanism for cleaning threshold grain in a combine harvester, said cleaning mechanism having a frame; a cleaning cylinder rotatably mounted on said frame about an axis of rotation extending in a fore-and-aft direction; a rotatable infeed mechanism mounted on said frame forwardly of said cleaning cylinder; a fan rotatably supported by said frame proximate to said cleaning cylinder; and drive means for rotatably powering said cleaning cylinder, said infeed mechanism and said fan, said drive means being operatively connected to a drive transfer means for transferring rotational power from a prime mover, an improved drive means comprising:

a composite drive shaft defining said axis of rotation, said cleaning cylinder, said infeed mechanism and said fan being rotatable about said axis of rotation, said composite drive shaft including a first shaft member rotatably supported by said frame and having a tubular portion forming the inwardmost end thereof and a second shaft member rotatably supported by said frame and rotatably received within said tubular portion of said first shaft member;

a first pulley connected to said first shaft member in operative communication with said drive transfer means to drivingly rotate said first shaft member;

a second pulley rotatably mounted on said first shaft member in operative communication with said drive transfer means for rotation independently of said first shaft member;

a third pulley connected to said second shaft member in operative communication with said drive transfer means to drivingly rotate said second shaft member; and a fourth pulley rotatably mounted on said second shaft member in operative communication with said drive transfer means for rotation independently of said second shaft member.

2. The cleaning mechanism of claim 1 wherein said infeed mechanism is driven by said first shaft member, said fan being mounted forwardly of said infeed mechanism and operatively connected to said second pulley for rotation thereof independently of said infeed mechanism.

3. The cleaning mechanism of claim 1 wherein said cleaning cylinder is operatively connected to said fourth pulley for rotation thereof independently of said second shaft member.

4. The cleaning mechanism of claim 3 wherein said cleaning cylinder includes at least one member mounted for a generally fore-and-aft reciprocating movement, said cleaning mechanism further having an oscillating means for reciprocatably moving said at least one member, said oscillatory means being operatively driven by said second shaft member.

5. The cleaning mechanism of claim 4 further comprising an impeller rotatably mounted on said frame within said cleaning cylinder, said impeller being rotatably driven by said second shaft member.

6. The cleaning mechanism of claim 5 wherein each said pulley is rotatably driven at a different rotational speed.

7. The cleaning mechanism of claim 6 wherein said first shaft member terminates at the rearward end of said infeed mechanism.

8. The cleaning mechanism of claim 7 wherein said tubular portion of said first shaft member extends substantially along the axial length of said infeed mechanism, said second shaft member being supported within said tubular member by bearings positioned adjacent each end of said tubular member.

9. The cleaning mechanism of claim 8 wherein said tubular portion of said first shaft member forms an auger tube to which helical flighting is attached to form an infeed auger in said infeed mechanism.

10. In a rotary cleaning mechanism for cleaning threshed grain in a combine harvester, said cleaning mechanism having a frame; a cleaning cylinder rotatably mounted on said frame about an axis of rotation extending in a fore-and-aft direction; a rotatable infeed mechanism mounted on said frame forwardly of said cleaning cylinder; a fan rotatably supported by said frame proximate to said cleaning cylinder; and drive means for rotatably powering said cleaning cylinder, said infeed mechanism and said fan, said drive means being operatively connected to a drive transfer means for transferring rotational power from a prime mover, an improved drive means comprising:

a composite drive shaft defining said axis of rotation, said cleaning cylinder, said infeed mechanism and said fan being rotatable about said axis of rotation, said composite drive shaft including a first shaft member rotatably supported by said frame and having a tubular portion forming an inwardmost end thereof and a second shaft member rotatably supported by said frame and rotatably received within said tubular portion of said first shaft member;

a first pulley connected to said first shaft member in operative communication with said drive transfer means to drivingly rotate said first shaft member;

a second pulley rotatably mounted on said first shaft member in operative communication with said drive transfer means for rotation independently of said first shaft member; and a third pulley associated with said second shaft member in operative communication with said drive transfer means for rotation independently of said first and second pulleys.

11. The cleaning mechanism of claim 10 wherein said infeed mechanism is driven by said first shaft member and said fan is operatively connected to said second pulley for rotation thereof independently of said infeed mechanism.

12. The cleaning mechanism of claim 11 wherein said cleaning cylinder is operatively connected to said third pulley for rotation thereof independently of the infeed mechanism and the fan.

13. The cleaning mechanism of claim 12 wherein said third pulley is rotatably mounted on said second shaft member for rotation of the cleaning cylinder independently of said second shaft member.

14. The cleaning mechanism of claim 13 wherein said cleaning cylinder includes at least one member mounted for a generally fore-and-aft reciprocating movement, said cleaning mechanism further having an oscillating means for reciprocatably moving said at least one member, said oscillatory means being operatively driven by said second shaft member.

15. The cleaning mechanism of claim 14 further comprising a fourth pulley connected to said second shaft member in operative communication with said drive transfer means to drivingly rotate said second shaft member and an impeller rotatably supported on said frame within said cleaning cylinder, said impeller being rotatably driven by said second shaft member.

16. The cleaning mechanism of claim 15 wherein each said pulley is rotatably driven at a different rotational speed.

17. The cleaning mechanism of claim 16 wherein said first shaft member terminates at the rearward end of said infeed mechanism.

18. The cleaning mechanism of claim 17 wherein said tubular portion of said first shaft member extends substantially along the axial length of said infeed mechanism, said second shaft member being supported within said tubular member by bearings positioned adjacent each end of said tubular member.

19. The cleaning mechanism of claim 18 wherein said tubular portion of said first shaft member forms an auger tube to which helical flighting is attached to form an infeed auger in said infeed mechanism.

20. The cleaning mechanism of claim 13 wherein each said pulley is rotatably driven at a different rotational speed.

* * * * *